(12) United States Patent
Kleinert et al.

(10) Patent No.: US 9,676,259 B2
(45) Date of Patent: Jun. 13, 2017

(54) COVER FOR A MOTOR VEHICLE ROOF

(71) Applicant: Webasto SE, Stockdorf (DE)

(72) Inventors: Oliver Kleinert, Stockdorf (DE); Steffen Lorenz, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 14/692,322

(22) Filed: Apr. 21, 2015

(65) Prior Publication Data

US 2015/0306944 A1 Oct. 29, 2015

(30) Foreign Application Priority Data

Apr. 29, 2014 (DE) .................. 10 2014 105 992

(51) Int. Cl.
*B60J 7/04* (2006.01)
*B62D 25/06* (2006.01)
*B60Q 3/208* (2017.01)

(52) U.S. Cl.
CPC ............... *B60J 7/04* (2013.01); *B62D 25/06* (2013.01); *B60Q 3/208* (2017.02)

(58) Field of Classification Search
CPC ............. B60J 7/043; B60Q 3/02; B62D 25/06
USPC ............. 296/211, 215, 216.01; 362/490, 493
See application file for complete search history.

(56) References Cited

U.S. PATENT DOCUMENTS

| | | | |
|---|---|---|---|
| 5,520,434 A * | 5/1996 | Paetz | B60J 7/00 296/211 |
| 8,500,192 B2 | 8/2013 | Labrot et al. | |
| 2007/0275216 A1 | 11/2007 | Grimm et al. | |
| 2011/0267833 A1 | 11/2011 | Verrat-Debailleul et al. | |
| 2011/0305869 A1 | 12/2011 | Pollak et al. | |
| 2012/0104789 A1* | 5/2012 | Plavetich | B60K 37/06 296/146.14 |
| 2015/0016132 A1 | 1/2015 | Verrat-Debailleul | |
| 2015/0078020 A1* | 3/2015 | Verrat | B32B 17/10036 362/509 |
| 2015/0109805 A1 | 4/2015 | Verrat-Debailleul et al. | |
| 2015/0210040 A1* | 7/2015 | Bohm | B32B 7/02 362/493 |
| 2015/0291089 A1* | 10/2015 | Verrat-Debailleul | B60Q 3/0213 362/511 |
| 2016/0161081 A1 | 6/2016 | Verrat-Debailleul | |

FOREIGN PATENT DOCUMENTS

| | | |
|---|---|---|
| CN | 201580234 U | 9/2010 |
| CN | 102333664 A | 1/2012 |
| DE | 297 08 802 U1 | 8/1997 |
| DE | 10 200 401 0597 A1 | 7/2005 |
| DE | 10 200 901 1265 A1 | 9/2010 |

(Continued)

*Primary Examiner* — Jason S Morrow
(74) *Attorney, Agent, or Firm* — Fitch, Even, Tabin & Flannery LLP

(57) ABSTRACT

A cover for a motor vehicle roof has a first sheet of planar extent with a main area, a second sheet of planar extent, which is arranged on the main area of the first sheet and has a main area facing away from the first sheet, the main area of the second sheet being smaller than the main area of the first sheet, so that the first sheet has a region projecting beyond the second sheet, a coupling element, which is coupled to the first sheet at the projecting region and is coupled to the main area of the second sheet, in order to fix the second sheet to the first sheet.

11 Claims, 2 Drawing Sheets

(56) References Cited

FOREIGN PATENT DOCUMENTS

| | | |
|---|---|---|
| DE | 10 201 101 6433 A1 | 10/2012 |
| EP | 1 859 931 A1 | 11/2007 |
| WO | 2010049638 A1 | 5/2010 |
| WO | 2013110885 A1 | 8/2013 |

* cited by examiner

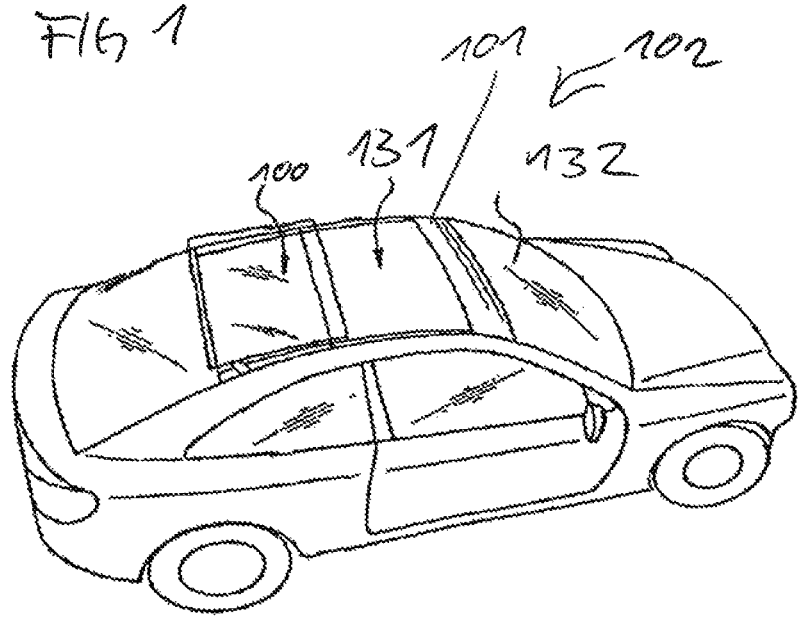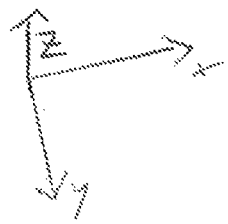

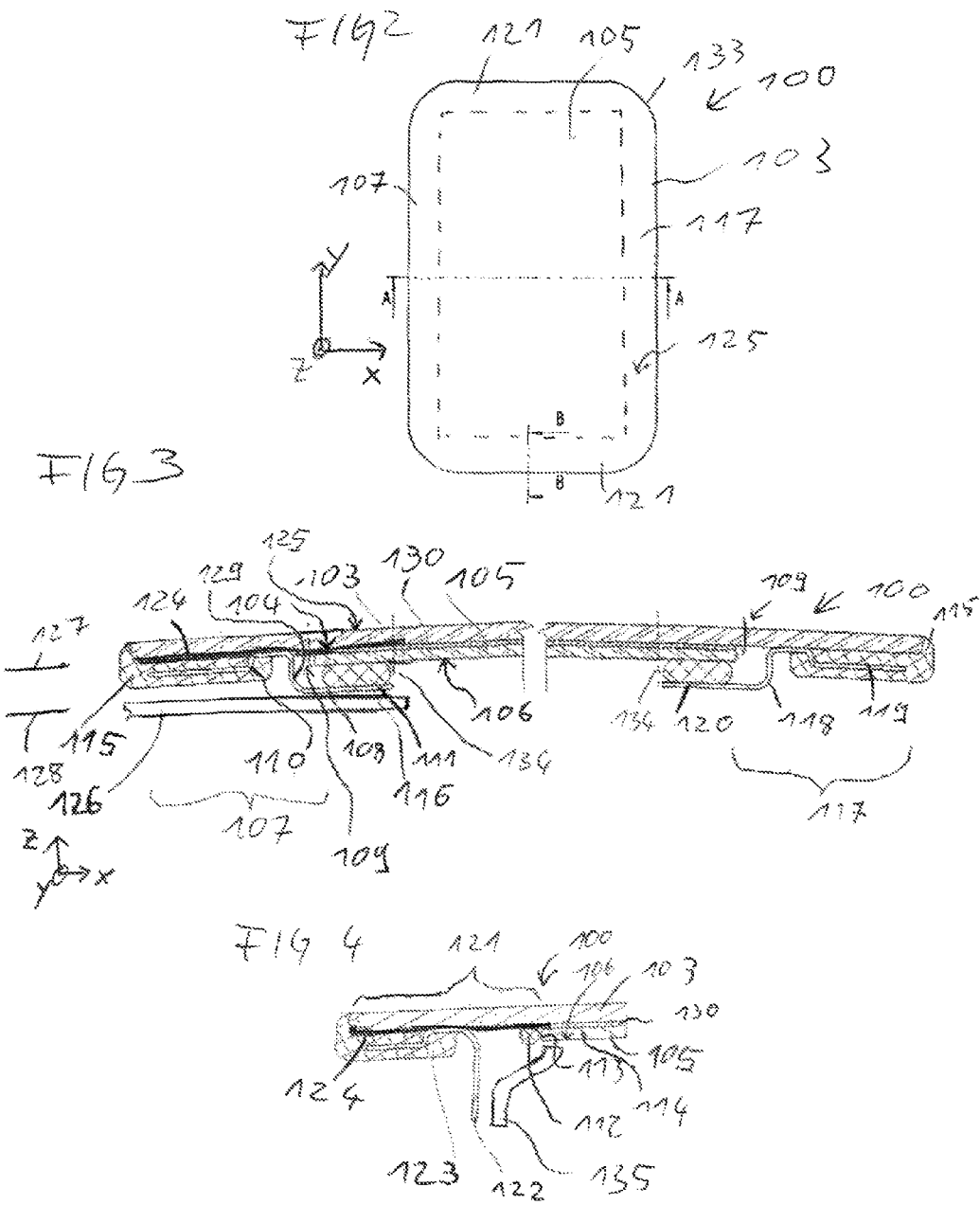

COVER FOR A MOTOR VEHICLE ROOF

CROSS REFERENCE TO RELATED APPLICATION

The present application is based on and claims priority of German Patent Application No. 10 2014 105 992.1 filed Apr. 29, 2014. The entire disclosure of the above-identified application, including the specification, drawings and claims are incorporated herein by reference in its entirety for all purposes.

The invention relates to a cover for a motor vehicle roof, in particular a cover that is arranged movably in relation to the vehicle roof, or a fixed glass element.

Motor vehicles can be equipped with a roof opening that is closed by a transparent cover. Light can enter the interior of the vehicle through the transparent cover. The cover can be fitted in a fixed or movable fashion in order to make it possible to at least partially open the roof opening.

It is desirable to provide a cover for a motor vehicle that can be used reliably.

According to embodiments of the invention, a cover for a motor vehicle roof has a first sheet of planar extent with a main area. The cover has a second sheet of planar extent, which is arranged on the main area of the first sheet. The second sheet has a main area facing away from the first sheet. The main area of the second sheet is smaller than the main area of the first sheet. The first sheet has a region projecting beyond the second sheet. The cover has a coupling element. The coupling element is coupled to the first sheet at the projecting region. The coupling element is coupled to the main area of the second sheet. As a result, the second sheet is fixed to the first sheet.

The first sheet and the second sheet are connected to one another by means of the coupling element. Consequently, a force-transmitting coupling between the first sheet and the second sheet is realized by the coupling element. It is consequently possible to provide the second sheet as smaller in the main area of extent than the first sheet. The second sheet is securely fastened to the first sheet by the coupling element.

For example, in the event of a break of the first sheet at the projecting region, it is avoided that a middle part of the cover comes away. The break is bridged by means of the coupling element, so that the middle part remains connected to the outer region. The second sheet can be connected to the vehicle roof by means of the coupling element. Consequently, detachment of the second sheet from the vehicle roof is avoidable. The coupling element to the greatest extent prevents the second sheet from unwantedly entering the interior of the vehicle or the area around the vehicle if the cover breaks, for example in the event of an accident. Even if there is a peripheral break of the first sheet around the second sheet, the composite assembly of the two sheets remains attached to the vehicle structure by means of the coupling element. As a result, it is possible to make the second sheet so small that it is only provided in the regions that are visible from the interior of the vehicle. In this way, a material saving is possible. This allows the costs and/or weight of the cover to be reduced. By virtue of the coupling element, reliable operation is possible in spite of the differing sizes of the first sheet and the second sheet.

The first sheet is for example a glass sheet. According to further embodiments, the first sheet is a plastic sheet. The second sheet is for example a plastic sheet. According to embodiments, the second sheet is a glass sheet. According to further embodiments, the first sheet and/or the second sheet respectively comprise different materials that are suitable for a cover for a roof of a motor vehicle. For example, the first sheet is formed from a tinted safety glass. The second sheet is for example formed from a colourless glass.

According to further embodiments, the cover has a light source, which is arranged laterally with respect to the second sheet, in order to couple light into a side of the second sheet that is transverse to the main area. The light source is in particular arranged on a projecting region that is aligned transversely to the first projecting region. For example, the coupling element is arranged during operation on a side of the cover that is aligned along a main travelling direction of the motor vehicle. The light source is for example arranged during operation at the front of the cover in the main travelling direction of the motor vehicle. According to further embodiments, the light source is arranged at the rear of the cover or both at the front and at the rear. According to further embodiments, the light source is arranged laterally on the cover along the main travelling direction.

The light source has in particular one or more light-emitting diodes (LEDs). According to further embodiments, the light source alternatively or additionally has a light-guiding element, in order to couple light into the side of the second sheet. For example, the light source has optical waveguides. According to further embodiments, the light source comprises other elements that are designed to be arranged on the cover and to couple light into the second sheet.

According to embodiments, the second sheet acts as a light-guiding sheet. The materials of the first sheet and of the second sheet and also an adhesive that connects the first sheet and the second sheet to another are made to match one another in such a way that total reflection of light occurs in the second sheet and propagates in the second sheet along the main area. Total reflection takes place at both main areas of the second sheet. It is consequently possible to distribute coupled-in light homogeneously over the entire surface area or virtually the entire surface area of the second sheet.

According to embodiments, the second sheet has an element to diffuse light. For example, the second sheet has an imprint, at which the light is diffused. Alternatively or additionally, the second sheet has a laser structuring, at which the light is diffused. Alternatively or additionally, the second sheet has an embossing, at which the light is diffused. Alternatively or additionally, the second sheet has a structuring introduced by machining, at which the light is diffused. Alternatively or additionally, arranged in the second sheet are nanoparticles, at which the light is diffused. The diffused light couples out from the second sheet, and consequently out from the cover. The diffused light is for example used for lighting the interior of the motor vehicle.

According to further embodiments, a surrounding border is provided at the projecting region of the first sheet that is aligned transversely to the coupling element. A fastening element is fixed to the first sheet by means of the surrounding border. The surrounding border is for example an injection-moulded plastic encapsulation or a foam-moulded plastic encapsulation. The fastening element is in particular only connected to the first sheet and is not in direct contact with the second sheet. The fastening element serves for example for mounting the cover on the motor vehicle roof. According to embodiments, both the light source and the surrounding border with the fastening element are arranged at a common projecting region of the first sheet. According to further embodiments, the light source is omitted.

According to embodiments, the coupling element is fixed to the first sheet by means of a further surrounding frame.

The surrounding frame is for example a foam-moulded-on plastic surrounding frame or an injection-moulded-on plastic surrounding frame. The coupling element is connected to the surrounding frame in a form-fitting and material-bonding manner. In this way, reliable fixing of the coupling element to the first sheet is realized. For example, the first sheet is completely surrounded at its border by the surrounding frame. The surrounding frame extends along all the projecting regions of the first sheet and fixes both the coupling elements and the fixing elements to the first sheet.

According to further embodiments, the cover has an adhesively bonded joint, which is arranged between the main area of the second sheet and the coupling element. The adhesively bonded joint fixes the coupling element to the second sheet. The second sheet is connected in a material-bonding manner to the coupling element by means of the adhesively bonded joint. Consequently, the second sheet is coupled to the coupling element by means of the adhesively bonded joint and subsequently coupled to the vehicle roof by means of the surrounding border. In this way, the second sheet can be reliably coupled to the vehicle structure.

According to further embodiments, the first sheet has an imprint on the main area. The imprint is applied in a region that corresponds to the projecting region. In particular, the imprint is a ceramic imprint. By means of the imprint, the outer edge of the second sheet is covered from the outside and as far as possible is not visible. According to embodiments, the imprint extends from the outer border of the first sheet beyond the coupling element into the interior. Consequently, the coupling element and the adhesively bonded joint are covered and as far as possible are not visible from the outside. According to further embodiments, the imprint is alternatively or additionally provided in the further projecting region at which the light source is arranged. Consequently, the light source is covered and as far as possible is not visible from the outside.

According to further embodiments, the cover has a screen, which is arranged at the projecting region and covers the coupling element. Consequently, the structure comprising the cover with the set-back second sheet, and possibly the light source, is not directly evident. This produces a good appearance.

The cover with the two sheets, of which the one that is outwardly directed during operation is made larger, also makes modular use possible. With the same first sheet with the same framing element, an unlighted variant is possible, comprising the first sheet, the coupling element and the surrounding frame. The lighted variant has the same components and additionally the second sheet, the lighting element and the adhesively bonded joint between the coupling element and the second sheet. The light source is arranged independently of the fastening element and the coupling element. Consequently, the light source has no influence on the force-transmitting elements of the cover. The light-conducting sheet is chosen to be only as large as is necessary for the lighting function. In comparison with conventional covers, in which the two sheets are made to be of the same size or virtually the same size, weight savings and cost savings are thereby obtained. In the event of an accident, the cover has a high level of safety. Moreover, the light source is easily accessible for assembly or disassembly or in the event of a repair, since the coupling element with the adhesively bonded joint is arranged in a different region than the light source.

Further advantages, features and developments are obtained from the following examples that are explained in conjunction with the figures. Elements that are the same, of the same type or have the same effect may be provided here with the same designations. The elements shown and their relative sizes in relation to one another are not to scale. Rather, individual elements may be shown exaggerated in thickness or in size for the sake of better representation or better understanding.

In the figures:

FIG. 1 shows a schematic representation of a motor vehicle according to embodiments, FIG. 2 shows a schematic representation of a plan view of a cover according to embodiments, FIG. 3 shows a first sectional view of the cover according to embodiments, and FIG. 4 shows a second sectional view of the cover according to embodiments.

FIG. 1 shows a motor vehicle 102. The motor vehicle has a motor vehicle roof 101. The motor vehicle roof has a roof opening 131. The roof opening can be closed by a cover 100. According to embodiments, the cover 100 is arranged movably in relation to the rest of the vehicle roof 101. This makes it possible optionally to close or at least partially open the roof opening 131 by means of the cover 100. For example, the cover 100 is part of a panoramic roof, a spoiler roof, a sliding roof, for example an externally guided sliding roof, and/or a lift-up and slide-back roof. According to further embodiments, the cover 100 is arranged immovably with respect to the rest of the vehicle roof 101, and in particular is a so-called fixed glass element. The motor vehicle 102 is for example a passenger car. Arranged at the front in the main travelling direction is a front sheet 132. The X direction corresponds to the main travelling direction. The Y direction is aligned transversely thereto and the the Z direction is upward.

FIG. 2 shows a plan view of the cover 100. In particular, a second main area 125 of a first sheet 103 of the cover 100 is represented. Arranged on a main area 104 (FIG. 3) of the first sheet 103 that is opposite from the second main area 125 in the Z direction is a second sheet 105. The second sheet 105 is made smaller in the X direction and the Y direction than the first sheet 103. Consequently, along its border 133, the first sheet 103 projects beyond the second sheet 105. Consequently, two projecting regions 107 and 117 are formed in the X direction. Two projecting regions 121 are likewise formed in the Y direction. According to embodiments, the first sheet 103 does not project beyond the second sheet 105 on all four sides. For example, in the Y direction, the first sheet 103 only projects beyond the second sheet 105 on one side and on the opposite side the first sheet 103 and the second sheet 105 finish flush with one another at the border 133. For example, in the X direction, the first sheet 103 only projects beyond the second sheet 105 on one side and on the opposite side the first sheet 103 and the second sheet 105 finish flush with one another at the border 133.

FIG. 3 shows a sectional view of the cover 100 along the line A-A of FIG. 2. The cover 100 has the first sheet 103 with the main area 125 and the opposite main area 104. Arranged on the main area 104 of the first sheet 103 is the second sheet 105. The first sheet 103 and the second sheet 105 are connected to one another in particular by means of an adhesive layer 130. The adhesive layer 130 is in particular an intermediate laminating layer, which connects the two sheets 103 and 105 to one another as a composite glass pane. The second sheet 105 has a main area 106 facing away from the first sheet 103.

On the left and right of the second sheet 105 in the X direction, the first sheet 103 projects beyond the second sheet 105 in the regions 107 and 117. In the projecting region 107, a surrounding border 115 is provided, in particular an injection-moulded plastic encapsulation or foam-moulded plastic encapsulation. For example, the surrounding border 115 is also provided on the opposite side at the projecting region 117. The surrounding border 115 encloses a first region 110 of a coupling element 108. The coupling element 108 is fixed to the first sheet 103 by means of the surrounding border 115.

The coupling element 108 extends in the X direction from the first region 110 over the main area 106 of the second sheet 105. A second region 111 of the coupling element 108 is connected to the main area 106 of the second sheet 105 by means of an adhesively bonded joint 116. Consequently, the coupling element 108 is connected to the first sheet 103 at the first region 110 and to the second sheet 105 at the second region 111. The coupling element 108 consequently connects the first sheet 103 to the second sheet 105.

According to embodiments, the coupling element 108 extends with the first region 110 in a first plane 127. The second region 111 is arranged in a second plane 128. The two planes 127 and 128 are arranged at a distance from one another. Arranged between the first region 110 and the second region 111 is a sloping region 129, which is predetermined on the basis of the thickness in the Z direction of the second sheet 105 and of the adhesively bonded joint 116.

Correspondingly arranged in the projecting region 117 is a further coupling element 118, which is connected by its first region 119 to the surrounding border 115. A second region 120 of the coupling element 118 is connected to the second sheet 105 by means of an adhesive bond. The second sheet 105 is consequently connected to the first sheet 103 on both sides by means of a respective coupling element 108 and 118.

The cover 100 consequently has the first sheet 103, which is facing the outside during operation and on which the second sheet 105, inwardly facing during operation, is arranged by means of the adhesive layer 130. The first sheet 103 is for example a tinted safety glass. The second sheet 105 is for example a partially toughened colourless glass. The second sheet 105 is set back from the first sheet 103.

The second sheet 105 is connected in a material-bonding manner to the coupling element 108 or 118 by means of the adhesively bonded joint 116. The coupling element 108 or 118 is connected in a form-fitting and material-bonding manner to the surrounding border 115. Consequently, the second sheet is coupled to the first sheet 103 by means of the coupling elements 108 and 118 even in the event of a break, for example at a breaking edge 109. In the event of a break of the first sheet 103 and the second sheet 105, for example along a breaking edge 134, the two sheets 103 and 105 remain coupled to the coupling element 108 or 118 by means of the adhesive layer 130 and the adhesively bonded joint 116. Consequently, the parts of the cover 100 are always securely coupled and cannot enter the interior of the vehicle or the area around the vehicle during operation.

According to embodiments, an imprint 124, in particular a black ceramic print, is provided on the main area 104, in the region between the border 133 and the second sheet 105. According to embodiments, the imprint 124 extends in the projecting region 107 on the main area 104 over the coupling element 108. The imprint in the bordering region of the first sheet 103 conceals a view from the outside of the outer edge of the second sheet 105, and in particular of the coupling element 108 and the adhesively bonded joint 116. The imprint 124 may be arranged around the periphery on the first sheet 103 or only in partial regions. According to further embodiments, no imprint 124 is provided, as represented by way of example in the region 117.

According to further embodiments, a screen 126 is provided. The screen covers the coupling element 108, the adhesively bonded joint 116 and possibly the surrounding border 115. The structure of the cover in the bordering region with the projecting region 107 is consequently not evident from the inside. According to embodiments, a screen is arranged along the entire border 133 of the first sheet 103. According to further embodiments, the screen 126 is only arranged in partial regions. According to further embodiments, no screen 126 is provided.

FIG. 4 shows a sectional view of the cover 100 along the line B-B of FIG. 2.

At the projecting region 121 of the first sheet 103, a surrounding border 123 is provided, in particular an injection-moulded-on plastic surrounding border or a foam-moulded-on plastic surrounding border. According to embodiments, the surrounding border 123 adjoins the surrounding borders 115, and is consequently part of a complete or virtually complete surrounding border of the cover 100.

A light source 112 is arranged on a side 113 of the second sheet 105 that runs transversely to the main area 106. The light source 112 is fixed in particular to the first sheet 103. The light source 112 is designed to couple light into the second sheet 105 during operation by way of the side 113. In the sheet 105, the light is distributed as uniformly as possible over the entire surface area of the second sheet 105, in particular by total reflection. Elements 114 to diffuse the light are provided on the second sheet 105. The diffused light couples out from the second sheet 105 at the main area 106. In this way it is possible during operation to light an interior of the motor vehicle 102 by means of the light source 112 and the second sheet 105.

The light source 112 has for example one or more LEDs or other light-emitting devices. The light source 112 alternatively or additionally has optical waveguides, which run along the side 113. The light source 112 is consequently for example a direct light source or a light guide that guides the light of a lamp (not represented) into the second sheet 105.

In the surrounding frame 123, part of a fastening element 122 is fastened. The fastening element 122 serves in particular for fastening the cover 100 to the vehicle roof 101 or to the body of the vehicle. The fastening element 122 is connected in a form-fitting and material-bonding manner to the surrounding border 123. According to embodiments, the fastening element 122 is arranged completely at a distance from the second sheet 105. According to embodiments, the fastening element 122 and the second sheet 105 have no common contact region. The fastening element 122 is formed in such a way that the light source 112 is easily accessible.

According to embodiments, the imprint 124 is provided on the main area 104 in the region between the border 133 and the second sheet 105. According to embodiments, the imprint 124 extends in the projecting region 121 on the main area 104 over the light source 112. The imprint in the bordering region of the first sheet 103 conceals a view from the outside of the outer edge of the second sheet 105, and in particular of the light source 112 and the fastening element 122.

According to embodiments, a screen 135 is provided in the projecting region 121. According to further embodiments, the screen may be omitted. The screen 135 covers the light source 112 and the fastening element 122. This produces a uniform appearance for the occupants from inside the motor vehicle 102. Moreover, radiation of light directly from the light source 112 past the second sheet 105 into the interior of the vehicle is reduced.

According to embodiments, the surrounding border 123 is only provided with the fastening element 122 on one side. According to further embodiments, a further fastening element 122 is also arranged on the opposite side by means of a surrounding frame 123 on the first sheet 103.

According to further embodiments, during operation the projecting regions are turned by 90° in relation to the alignment as represented in FIG. 2. The light source is then arranged at the front and/or at the rear in the main travelling direction and the coupling element is arranged laterally. This corresponds to an interchange of the X direction and the Y direction in FIG. 2.

The arrangement of the surrounding border at the projecting regions 107, 117 and 121 and the arrangement of the light source 112 at the projecting region 121 has the effect that an influence of the light source 112 on the force-transmitting elements of the glazing can be avoided. The coupling element 108 and the light source 112 are arranged in respectively different projecting regions 107 and 121. During operation, the second sheet 105 only extends over the region that is required for the lighting function, in particular the visible region from the interior of the vehicle. The light source 112 is easily accessible for assembly or disassembly or for repair, since the adhesively bonded joint 116 and the coupling element 108 are respectively arranged in the other projecting regions 107 and 117 of the cover 100. The light source 112 is consequently accessible without destroying the sheets 103 and 105. Moreover, good heat dissipation of the heat occurring during the operation of the light source 112 is possible. The electrical contacting of the light source 112 is easily possible. In particular, it is possible to dispense with conducting the necessary electrical energy for the light source 112 into the sheets 103 and 105 and the adhesive layer 130. The light source 112 can be easily mounted on the projecting region 112. In particular, it is possible to dispense with laminating the light source 112 in.

The invention claimed is:

1. A cover for a motor vehicle roof, comprising:
   a first sheet of planar extent with a main area,
   a second sheet of planar extent, which is arranged on the main area of the first sheet and has a main area facing away from the first sheet,
   the main area of the second sheet being smaller than the main area of the first sheet, so that the first sheet has a region projecting beyond the second sheet,
   a coupling element, which is coupled to the first sheet at the projecting region and is coupled to the main area of the second sheet, in order to fix the second sheet to the first sheet, and
   a light source, which is arranged laterally with respect to the second sheet, in order to couple light into a side of the second sheet that is transverse to the main area.

2. The cover of claim 1, in which
   the first sheet has a further region projecting beyond the second sheet, which is aligned transversely to the first projecting region, and in which
   the light source is arranged at the further projecting region.

3. The cover of claim 2, comprising:
   a fastening element for fastening the cover to the motor vehicle roof, and
   a surrounding border, which is arranged at the further projecting region and fixes the fastening element to the first sheet.

4. The cover of claim 2, comprising:
   a screen, which is arranged at the further projecting region and covers the light source.

5. The cover of claim 1, in which the second sheet has an element to diffuse light.

6. The cover of claim 1, comprising:
   a surrounding border, which is arranged at the projecting region and fixes the coupling element to the first sheet.

7. The cover of claim 1, comprising:
   an adhesively bonded joint, which is arranged between the main area of the second sheet and a second region of the coupling element and fixes the coupling element to a second sheet.

8. The cover of claim 1, comprising:
   a screen, which is arranged at the projecting region and covers the coupling element.

9. The cover of claim 1, in which a first region of the coupling element runs in a first plane and a second region runs in a second plane, which is at a distance from the first plane, and in which the coupling element has a sloping region, which runs between the first region and the second region.

10. A cover for a motor vehicle roof, comprising:
    a first sheet of planar extent with a main area,
    a second sheet of planar extent, which is arranged on the main area of the first sheet and has a main area facing away from the first sheet,
    the main area of the second sheet being smaller than the main area of the first sheet, so that the first sheet has a region projecting beyond the second sheet, and
    a coupling element, which is coupled to the first sheet at the projecting region and is coupled to the main area of the second sheet, in order to fix the second sheet to the first sheet, wherein the first sheet and the second sheet are glued together by an adhesive layer.

11. A cover for a motor vehicle roof, comprising:
    a first sheet of planar extent with a main area,
    a second sheet of planar extent, which is arranged on the main area of the first sheet and has a main area facing away from the first sheet,
    the main area of the second sheet being smaller than the main area of the first sheet, so that the first sheet has a region projecting beyond the second sheet,
    a coupling element, which is coupled to the first sheet at the projecting region and is coupled to the main area of the second sheet, in order to fix the second sheet to the first sheet, and
    the second sheet is connected to the vehicle roof by the coupling element.

* * * * *